United States Patent
Hubauer et al.

(10) Patent No.: US 10,007,702 B2
(45) Date of Patent: Jun. 26, 2018

(54) PROCESSING AN INPUT QUERY

(71) Applicant: Siemens Aktiengesellschaft, Munich (DE)

(72) Inventors: Thomas Hubauer, Munich (DE); Steffen Lamparter, Feldkirchen (DE); Mikhail Roshchin, Feldkirchen (DE); Stuart Watson, Newark (GB)

(73) Assignee: Siemens Aktiengesellschaft, Munich (DE)

( * ) Notice: Subject to any disclaimer, the term of this patent is extended or adjusted under 35 U.S.C. 154(b) by 393 days.

(21) Appl. No.: 14/324,109

(22) Filed: Jul. 4, 2014

(65) Prior Publication Data
US 2015/0178353 A1    Jun. 25, 2015

(30) Foreign Application Priority Data
Dec. 19, 2013   (EP) ..................... 13198368

(51) Int. Cl.
*G06F 7/00* (2006.01)
*G06F 17/30* (2006.01)

(52) U.S. Cl.
CPC .. *G06F 17/30516* (2013.01); *G06F 17/30424* (2013.01); *G06F 17/30545* (2013.01); *G06F 17/30551* (2013.01); *G06F 17/30575* (2013.01)

(58) Field of Classification Search
CPC ......... G06F 17/30424; G06F 17/30575; G06F 17/30545
USPC ...................................................... 707/718
See application file for complete search history.

(56) References Cited

U.S. PATENT DOCUMENTS

| | | | | |
|---|---|---|---|---|
| 2003/0177111 A1* | 9/2003 | Egendorf | .......... | G06F 17/30864 |
| 2003/0220893 A1* | 11/2003 | Dettinger | .......... | G06F 17/30386 |
| 2011/0023055 A1* | 1/2011 | Thatte | ............ | G06F 9/541 |
| | | | | 719/328 |
| 2011/0320187 A1* | 12/2011 | Motik | ............ | G06F 17/278 |
| | | | | 704/9 |
| 2013/0290554 A1* | 10/2013 | Chen | .............. | H04L 41/14 |
| | | | | 709/231 |
| 2015/0032738 A1* | 1/2015 | Nachnani | .......... | G06F 17/30554 |
| | | | | 707/723 |

OTHER PUBLICATIONS

Storm topology, retrieved under http://storm-project.net on Jul. 7, 2014.
Ontop, a standard database system, retrieved under http://ontop.inf.unibz.it on Jul. 7, 2014.
Özcep Ö. L.: Semantics for OBDA on Streaming Data Sources, Available on Jul. 4, 2014 under url=https://www.posccaesar.org/svn/pub/ISO15926AndSemanticWebTechnologiesNetwork/oo.pdf&rct=j&frm=1&q=&esrc=s&sa=U&ei=46C2U_GOH43A7AayxID4Bg&ved=0CD4QFjAH&usg=AFQjCNG0eNVD5q55XvjuH3yzrqjV8Ilk9Q.
Brenninkmeijer C.Y.A. et al: A Semantics for a Query Language over Sensors, Streams and Relations, School of Computer Science, University of Manchester, Manchester M13 9PL, UK.

(Continued)

*Primary Examiner* — Van Oberly
(74) *Attorney, Agent, or Firm* — Beusse Wolter Sanks & Maire

(57) ABSTRACT

An embodiment relates to a method for processing an input query comprising: building an event processing framework based on the input query by converting operators of the input query into building blocks of the event processing framework.

12 Claims, 4 Drawing Sheets

(56) References Cited

OTHER PUBLICATIONS

Quoc H.N.M. et al: Super Stream Collider-Linked Stream Mashups for Everyone, Digital Enterprise Research Institute, 2012, NUI Galway.
Le-Phuoc D. et al: Elastic and Scalable Processing of Linked Stream Data in the Cloud; Lecture Notes in Computer Science, Springer Verlag; pp. 280-297; ISSN: 0302-9743; ISBN: 978-3-319-10553-6; XP047043445;Oct. 21, 2013.
Elliott B. et al: A complete translation from SPARQL into efficient SQL; Proceedings of the 2009 International Database Engineering & Applications Symposium on, IDEAS '09, New York; pp. 31-42; ISBN: 978-1-60-558402-7; DOI: 10.1145/1620432.1620437; XP055169377; Sep. 16, 2009.
Le-Phuoc D. et al: A Native and Adaptive Approach for Unified Processing of Linked Streams and Linked Data; The Semantic Web—ISWC 2011, Springer Verlag, Berlin—Heidelberg; pp. 370-388; ISBN: 978-3-642-25072-9; XP019168041; Jan. 1, 2011.
Wolf B. et al: Data stream processing in factory automation; Emerging Technologies and Factory Automation (ETFA), 2010 IEEE Conference on, IEEE, Piscataway, NJ; pp. 1-8; ISBN: 978-1-4244-6848-5; DOI: 10.1109/ETFA.2010.5641277; XP031937221; Sep. 13, 2010.
Jardine A.K.S. et al: A review on machinery diagnostics and prognostics implementing condition-based maintenance; Mechanical Systems and Signal Processing, London; vol. 20; No. 7; pp. 1483-1510; ISSN: 0888-3270; DOI: 10.1016/J.YMSSP.2005.09.012; XP024930393; Oct. 1, 2006.
Hoeksema J. et al: High-performance Distributed Stream Reasoning using S4; The 10th International Sematic WEB Conference, Bonn; pp. 1-20; XP055169991; Oct. 23, 2011.
Calbimonte J.-P. et al: Enabling Ontology-Based Access to Streaming Data Sources; The Semantic Web—ISWC 2010, Springer Verlag, Berlin—Heidelberg; pp. 96-111; ISBN: 978-3-642-17745-3; XP019159339; Nov. 7, 2010.
"SPARQL." Wikipedia. Wikimedia Foundation, Jan. 7, 2014. Web. Jul. 4, 2014. http://en.wikipedia.org/wiki/Sparql.
"Deliverable D5.1: A Semantics for Temporal and Stream-Based Query Answering in an OBDA Context", http://www.optique-project.eu/wp-content/uploads/2013/10/D5.1.pdf.
Kestelyn Justin; "Phoenix in 15 minutes or less"; retrieved on Nov. 20, 2015 from the Internet: URL:http://wayback.archive.org/web/20130524055831/http://blog.cloudera.com/blog/2013/03/phoenix-in-15-minutes-or-less/; XP055229910; pp. 1-3; 2013.

\* cited by examiner

PROCESSING AN INPUT QUERY

CROSS REFERENCE TO RELATED APPLICATIONS

This application claims priority to and the benefit of European Application No. EP13198368 filed Dec. 19, 2013, incorporated by reference herein in its entirety.

BACKGROUND OF THE INVENTION

Embodiments of the present invention relate to a method and various devices and systems for processing an input query.

Predictive and prescriptive data analytics have gained more and more interest over the last years. One application is diagnostics of technical systems such as production plants, power generation facilities, etc. In such applications, an operator wants an advanced diagnostic system to issue a warning prior to a critical situation (prediction), and to give advice on what should be done in order to prevent the predicted critical event (prescription).

Typically, technical systems as described above can be characterized by two complementary types of data: static and dynamic. The compositional structure of the system, its history, operational parameters, relation to other systems, etc. are typically stored in databases and change relatively seldom over time. In contrast, dynamic data such as sensor measurements, event data generated by control units, and external signals such as control or pricing information typically vary at a much higher frequency. For such data, storage in a database system is an option; however, to efficiently and effectively realize early warning systems with low latency, it is beneficial to (also) process streaming data, which are generated by the producing entities (e.g., measurement devices, sensors, etc.) themselves.

A stream may be considered as data of any sort being (e.g., serially or successively) supplied by a data source, e.g., sensor. In this regard, the stream may have a time-stamped relation and it may not be defined by a particular beginning and/or end.

In most cases, the amount of data available is huge and goes beyond what could be processed by a human operator. Moreover, even static information is not stored in a single place, e.g., a single data silo, but distributed among several databases (or, for dynamic data, streams) with varying structures and access methods.

Experts operating and maintaining such technical systems are not aware of the data storage landscape, but need easy access to the heterogeneous, distributed data.

Ontology-Based Data Access (or OBDA) is a method to provide end-users with data access based on their domain terminology, based on an internal translation of domain questions into queries over the distributed data sources. The Optique project (www.optique-project.eu) strives at bringing this idea to industry-scale reality.

Existing solutions to OBDA only handle data stored in databases and cannot cope with streaming data. Hence, streaming data must therefore first stored in a database, which leads to a delay and thus to suboptimal reaction times compared to direct processing of data streams.

SPARQL is an RDF query language, i.e., a query language for databases, able to retrieve and manipulate data stored in Resource Description Framework format (see, e.g., http://en.wikipedia.org/wiki/Sparql). STARQL is a temporal extension of SPARQL (see, e.g., "Deliverable D5.1: A Semantics for Temporal and Stream-Based Query Answering in an OBDA Context", http://www.optique-project.eu/wp-content/uploads/2013/10/D5.1.pdf).

SUMMARY

A first embodiment relates to a method for processing an input query comprising: building an event processing framework based on the input query by converting operators of the input query into building blocks of the event processing framework.

A second embodiment relates to a device comprising a controlling unit that is arranged for processing the following step: building an event processing framework based on an input query by converting operators of the input query into building blocks of the event processing framework.

A third embodiment relates to a device comprising at least one device as described herein.

A forth embodiment is directed to a device for processing an input query comprising means for building an event processing framework based on the input query by converting operators of the input query into building blocks of the event processing framework.

A fifth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

The solution presented herein proposes an approach for integrated query answering over static and dynamic (streaming) data.

It is based on the idea of translating input queries in SPARQL or STARQL into a combination of standard SQL queries over the static data, integrated with a so-called Storm topology (see, e.g., http://storm-project.net) that is created based on the query and used for evaluating the query over data streams.

The proposed solution thus realizes an integrated, streaming-based evaluation of (possibly temporal) queries, and extends the known OBDA approach to streaming data using in particular standard components for evaluation (providing stability, performance and reliability; e.g. using any standard database system, ontop (http://ontop.inf.unibz.it) or Storm (http://storm-project.net).

It is suggested combining ontology-based access to data with an integrated evaluation of static data stored in a database and dynamic data (e.g., streaming data). The query is converted based on a domain ontology into a combined query over at least one (in particular several or all) data sources, which is then evaluated partly by the database system and partly by an event processing framework, e.g., Storm (http://storm-project.net).

Figure 1:
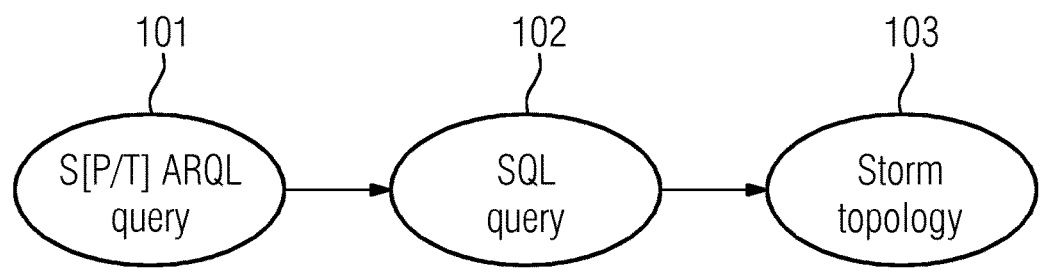
FIG. 1 shows a schematic diagram visualizing a two-step indirect rewriting approach in order to utilize existing research results on OBDA and to simplify a consideration of static and dynamic data.

FIG. 1 shows a schematic diagram visualizing a two-step indirect rewriting approach in order to utilize existing research results on OBDA and to simplify a consideration of static and dynamic data.

For the first rewriting step, translating a SPARQL (or STARQL) query 101 into an SQL query 102 has been intensively researched by the OBDA community. This translation step can be used, treating the scheme of the stream like a standard database scheme. However, the resulting (optimized) SQL query 102 is not evaluated directly on the collection of databases, but post-processed by a specialized component.

Based on syntactic features and query structure, this specialized component may determine which queries solely refer to data available in the static databases and it may provide their results as a view (either standard or materialized, depending on optimization considerations). The specialized component may then construct a Storm topology 103 where data sources (databases, views, streams) are represented by so-called Storm spouts. The SQL code may be translated into Storm topology 103 based on configurable patterns (also referred to as building blocks or RA bolts, see FIG. 2).

Next, every processing step of the SQL query 102 (or, analogously, every relational algebra operator) is represented by a processing bolt (in correspondence with relational algebra, there are four base bolts for cross-product, projection, selection and renaming). According to the storm terminology, a bolt is considered a processing entity.

Figure 2:
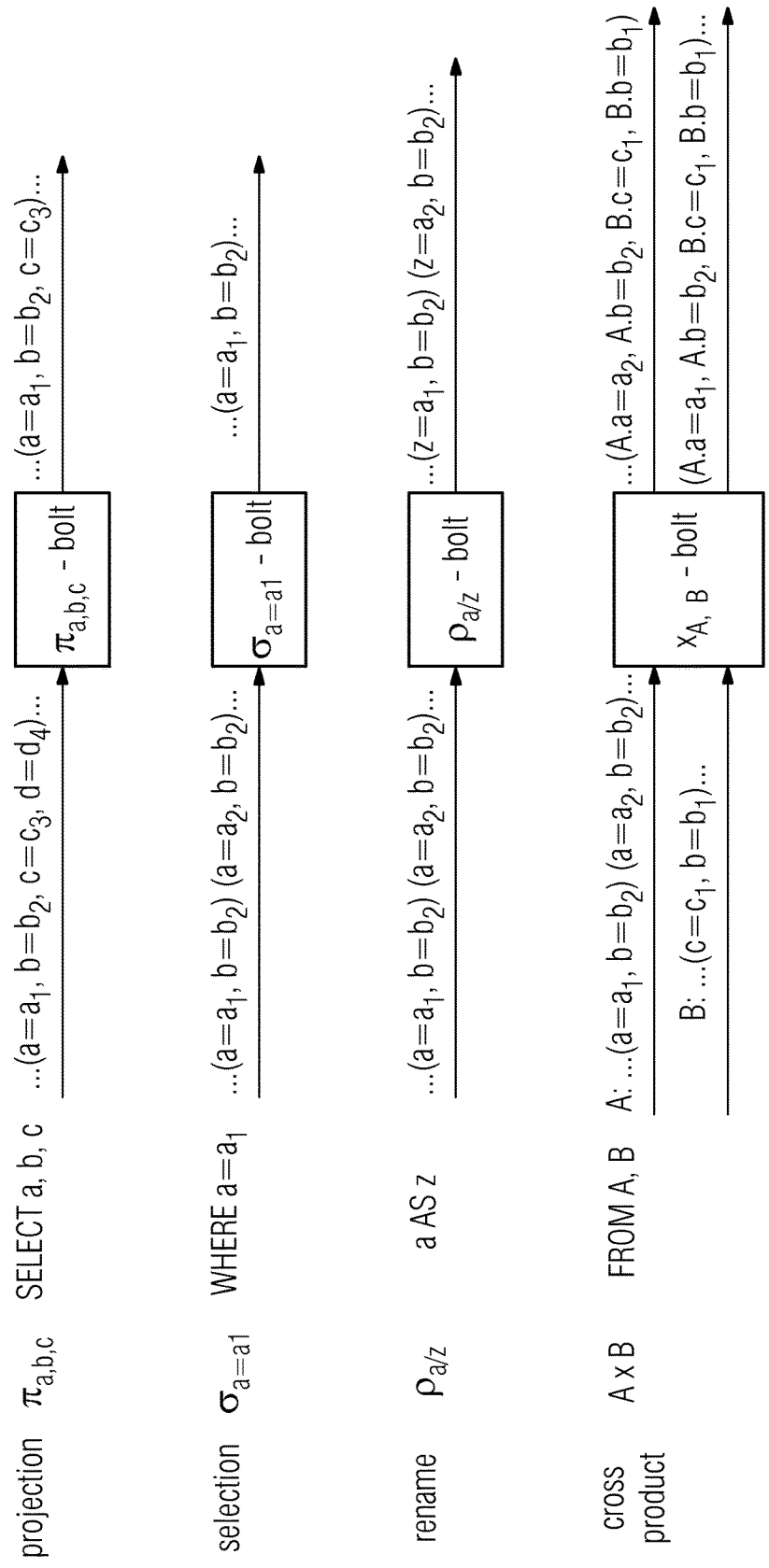
FIG. 2 shows a schematic table visualizing relational algebra bolts (RA bolts) as core building blocks.

FIG. 2 shows a schematic table visualizing relational algebra bolts (RA bolts) as core building blocks.

Storm relational algebra bolts (RA-bolts) provide an analog to relational algebra operators for streaming data and can be connected to a flexible topology representing a query formulated in relational algebra (or, analogously, SQL).

Derived operators (joins, etc.) may be added based on their translation into basic relational algebra operators. However, optimized dedicated nodes (e.g. for joins) may be used to avoid generating huge streams just to filter them in a subsequent step.

The Storm topology may be built based on the following considerations:

Tables (static data) and/or streams (dynamic data) referenced in a FROM clause may correspond to Storm spouts.

The structure of the statement (determined by parentheses and operator precedence) determines an information flow (streams) between bolts and spouts.

All bolts may be created by instantiating meta-bolts with concrete parameters.

The projection ($\pi_{attribute-list}$) and the rename ($\rho_{rename-list}$) are stateless bolts, the cross-product ($\times_{table-list}$) and the selection ($\sigma_{filter-list}$) may utilize an internal state, e.g., a full cross-product with past tuples or backwards-reference while filtering (time stamps can then be considered as normal attributes).

As a single bolt may have several output streams, optimizers may be used to reduce the number of bolts and reducing intermediate results.

In particular for joins, time windows are beneficial for scalability reasons.

For performance reasons, not every single operator may have to be represented by a single bolt: For example, a SQL JOIN may not be constructed from a cross-product and a selection bolt but by a specialized bolt that prunes the tuples that are generated and transmitted. The overall structure of the topology (streams between the bolts and spouts) may be determined by the structure of the SQL command/the relational algebra expression.

The Storm topology 103 may be deployed in a distributed setting and it may also run indefinitely, answering the user query over a continuously changing stream of data with consideration of the (possibly also changing) data stored in the database.

It is noted that in a direct rewriting approach, the step "SQL query" 102 is omitted and the SPARQL/STARQL queries may be directly translated into Storm topology based on configurable patterns.

It is also noted that the SQL query 102 may be syntactically extended by (e.g., user-defined) functions for time, which may in particular be ANSI SQL-92 compliant.

Figure 3:
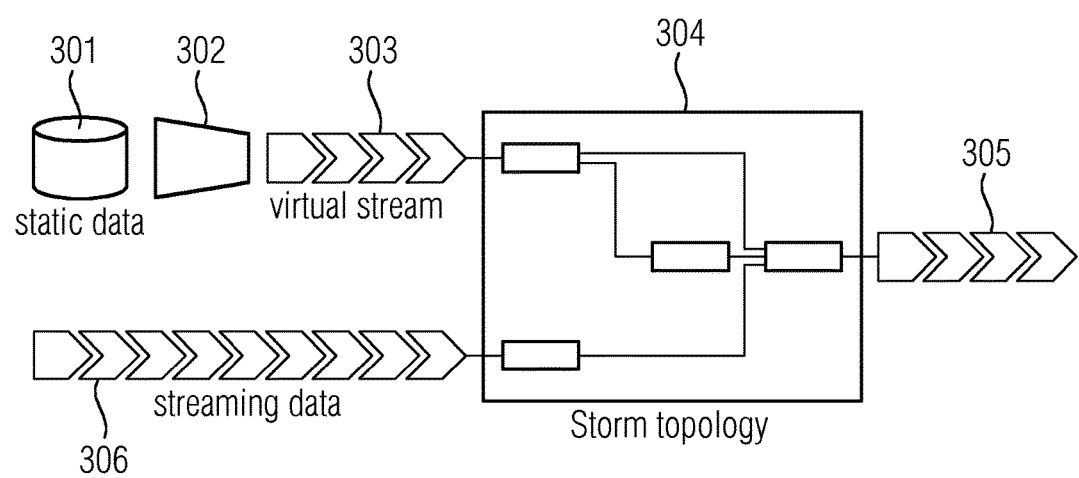
FIG. 3 shows a diagram visualizing an exemplary integration of static and dynamic data.

FIG. 3 shows a diagram visualizing an exemplary integration of static and dynamic data. Static data 301 is converted by a unit 302 ("streamification") into a virtual stream 303, which is fed together with streaming data 306 to a Storm topology 304. An output 305 indicates a result provided via the Storm topology 304.

An adapter (e.g. a Kafka spout) may be used to present the static data 301 to the Storm topology 304 as a virtual data stream 303.

Hence, the proposed solution may provide at least one of the following aspects:
- an ontology-based data access;
- an integrated access to and processing of static data and streaming data;
- a distributed evaluation of queries; and
- an exemplary architecture using existing components that are tested, reliable, performant, and scalable.

Hence, pursuant of an objective of OBDA, the user does not have to worry about where and how data is stored, whether it is static or streaming data, which schemata are used, etc. Instead, the user may focus on formulating queries to realize predictive and prescriptive analytics, using in particular the domain vocabulary the user is accustomed to. Invisible to the user, the query is translated and optimized into (possibly) several SQL queries plus a corresponding Storm topology which can be automatically deployed on a cluster processing the continuously incoming sensor and event stream data. Such efficient approach to integrated information provisioning and analytics enables domain users to make full use of data at hand without additional manpower thereby drastically improving the overall performance.

Also, using SQL as an intermediate step allows to identify SQL (sub-)queries that can be evaluated beforehand and used as view, e.g. due to the fact that the data is time-independent.

Figure 4:
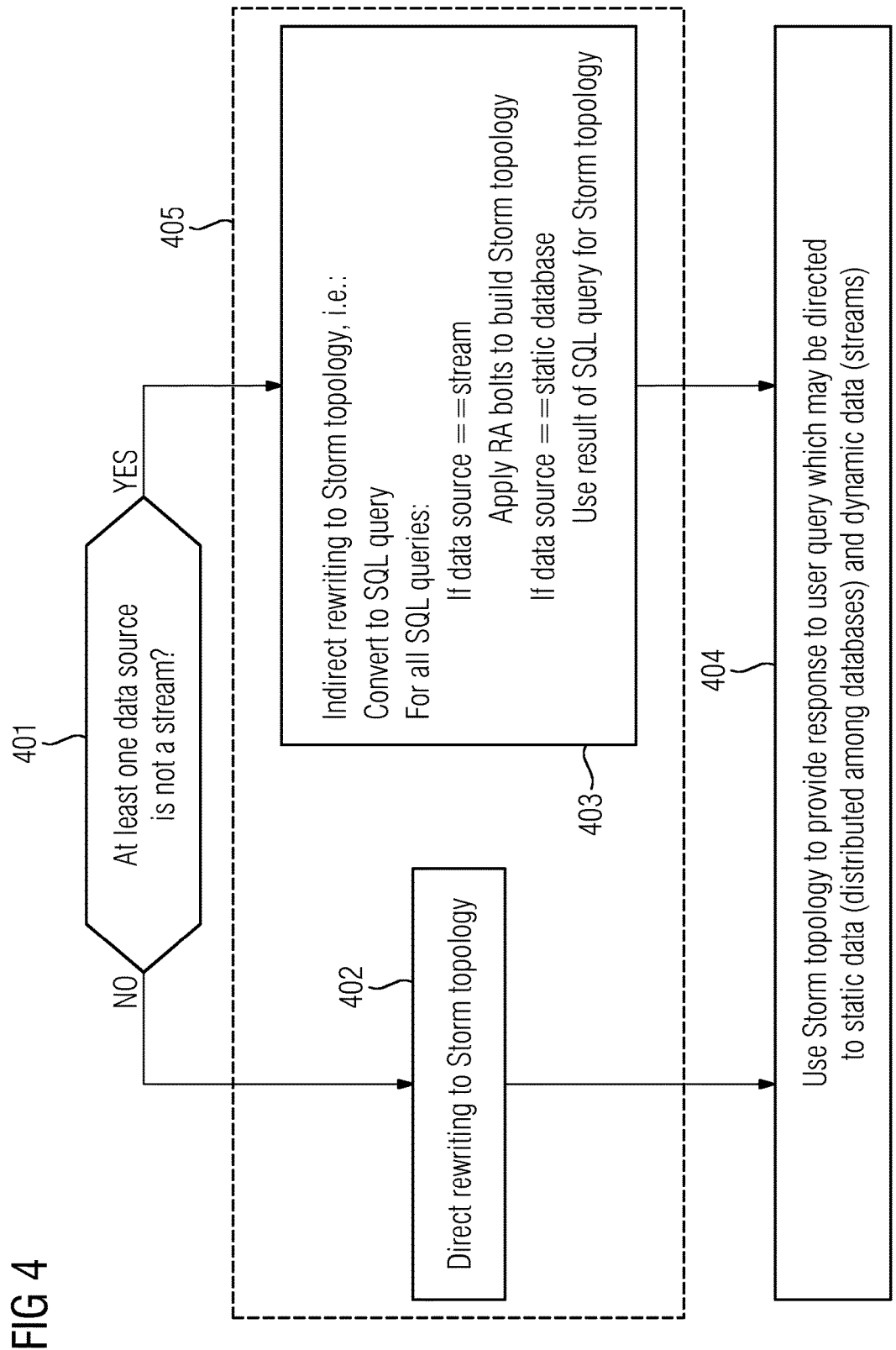
FIG. 4 shows a schematic flow diagram for processing an input query.

FIG. 4 shows a schematic flow diagram for processing an input query, which may be a SPARQL query or a STARQL query. In a step 401 it is determined whether at least one data source is not a dynamic data source (e.g., stream). If not, i.e. if only dynamic data sources (streams) are available, an event processing framework (e.g., Storm topology) is built based on the input query by converting operators of the input query into building blocks of the event processing framework. In a subsequent step 404, the event processing framework is used to provide a response to the input query.

If the condition of step 401 reveals that the query is run on merely static data sources (at least one database) or on static and dynamic data sources, an indirect rewriting approach 403 is used towards the event processing framework (e.g., said Storm topology). The input query may be converted into an SQL query. For each SQL query it is determined whether the data source is a dynamic data source (e.g., stream) and if this is the case, the building blocks of the event processing framework are used to build a topology of the event processing framework. It is also checked for each SQL query whether the data source is a static data source and if this is the case, the SQL query is applied to the static data and the result of the SQL query is forwarded to the event processing framework.

Hence the step 404 facilitates supplying a response based on the input queries utilizing static data (which may be distributed among databases) as well as dynamic data (streaming data).

It is noted that the steps 402 and 403 can be summarized as a step 405 for building the event processing framework.

The examples suggested herein may in particular be based on at least one of the following solutions. In particular combinations of the following features could be utilized in order to reach a desired result. The features of the method could be combined with any feature(s) of the device, apparatus or system or vice versa.

A method is suggested for processing an input query comprising:
building an event processing framework based on the input query by converting operators of the input query into building blocks of the event processing framework.

Hence, the input query is translated into building blocks of the event processing framework, which may be a Storm topology. Hence, the event processing framework that is capable of handling dynamic data, e.g., (data) streams, can be used to handle queries formulated as input queries on such dynamic data.

In an embodiment, the input query operates on dynamic data.

Dynamic data may in particular be streaming data, also referred to as streams.

In an embodiment, the building blocks of the event processing framework comprises relational algebra operators.

In an embodiment, the relational algebra operators comprise at least one of the following:
a projection;
a selection;
a rename operation;
a cross product;
a join operation;
a derived operation.

In an embodiment, the method further comprises:
converting the input query to an SQL query;
building the event processing framework based on the SQL query comprising the steps:
 if the input query is directed to dynamic data, building blocks of the event processing framework are used to build a topology of the event processing framework;
 if the input query is directed to static data, a result of the SQL query is forwarded to the event processing framework.

Static data may be data stored in at least one database. The at least one database can be located in a single device or it can be distributed among several physical devices.

Hence, the SQL query can be processed beforehand and the results of the SQL query may be provided to the event processing framework. Thus, the event processing framework may focus on processing the queries directed to dynamic data.

In an embodiment, the method further comprises:
converting the input query to an SQL query;
building the event processing framework based on the SQL query comprising the steps:
 if the input query is directed to dynamic data, building blocks of the event processing framework are used to build a topology of the event processing framework;
 if the input query is directed to static data, operators of the SQL query are converted into building blocks of the event processing framework;
using the event processing framework for providing a response to the input query utilizing dynamic data and static data.

Hence, it is an alternative option to translate the SQL query into building blocks of the event processing framework and to run the event processing framework on the input query as well as on the SQL query.

In an embodiment, the method further comprises:
using the event processing framework for providing a response to the input query utilizing dynamic data and static data.

Hence, the query can operate on the dynamic data as well as on the static data. The access to the type of data is transparent to the user.

In an embodiment, the input query comprises a SPARQL query.

In an embodiment, the input query comprises a STARQL query.

In an embodiment, the event processing framework is a Storm topology.

In an embodiment, processing the input query may be used for controlling a technical system.

Such controlling may comprise diagnosing, adjusting, accessing or setting parameters of an industrial system. The industrial system may comprise at least one of the following: a machine, a factory, an assembly or production line, a manufacturing site an industrial application.

Also, a device is provided, said device comprising a controlling unit that is arranged for processing the following step:
building an event processing framework based on an input query by converting operators of the input query into building blocks of the event processing framework.

In an embodiment, the device is further arranged for processing the steps:
converting the input query to an SQL query;
building the event processing framework based on the SQL query comprising the steps:
 if the input query is directed to dynamic data, building blocks of the event processing framework are used to build a topology of the event processing framework;
 if the input query is directed to static data, a result of the SQL query is forwarded to the event processing framework.

In an embodiment, said device is a control device of the industrial system.

In an embodiment, the device is connected to the industrial system via a network, in particular via the Internet.

A system is provided, said system comprising at least one device as described herein.

Also, a device is suggested for processing an input query comprising:

means for building an event processing framework based on the input query by converting operators of the input query into building blocks of the event processing framework.

A computer program product is provided, which is directly loadable into a memory of a digital processing device, comprising software code portions for performing the steps of the method as described herein.

Functions described herein may be implemented at least partially in hardware, such as specific hardware components or a processor, e.g., in hardware, processors, software, firmware, or any combination thereof. If implemented in software, the functions may be stored on or transmitted over as one or more instructions or code on a computer-readable medium and executed by a hardware-based processing unit.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing an input query associated with static data and dynamic data comprising:
    building an event processing framework based on the input query by converting operators of the input query into building blocks of the event processing framework, and further comprising:
    converting the input query to an SQL query;
    building the event processing framework based on the SQL query comprising the steps of:
        for the dynamic data, building blocks of the event processing framework to build a topology of the event processing framework; and
        for the static data, forwarding a static data result of the SQL query to the event processing framework;
    converting the static data result into a virtual data stream for forwarding together with the dynamic data to the event processing framework;
    providing the virtual data stream and the dynamic data to the event processing framework; and
    using the event processing framework for providing a response to the input query utilizing the dynamic data and the static data result.

2. The method according to claim 1, wherein the input query operates on the dynamic data.

3. The method according to claim 1, wherein the building blocks of the event processing framework comprises relational algebra operators.

4. The method according to claim 3, wherein the relational algebra operators comprise the following:
    a projection;
    a selection;
    a rename operation;
    a cross product;
    a join operation; and
    a derived operation.

5. The method according to claim 1, wherein the SQL query comprises a SPARQL query.

6. The method according to claim 1, wherein the SQL query comprises a STARQL query.

7. The method according to claim 1, wherein processing the input query is used for controlling a technical system.

8. A computer program product directly loadable into a memory of a digital processing device, comprising software code portions for performing the steps of the method according to claim 1.

9. A device comprising a controlling unit that is arranged for processing the following step:
    building an event processing framework based on an input query associated with static data and dynamic data by converting operators of the input query into building blocks of the event processing framework,
    wherein the controlling unit is further arranged for processing the steps:
    converting the input query to an SQL query;
    building the event processing framework based on the SQL query comprising the steps of:
    for the dynamic data, building blocks of the event processing framework to build a topology of the event processing framework; and
    for the static data, forwarding a static data result of the SQL query to the event processing framework; and
    the device is arranged to convert the static data result into a virtual data stream for forwarding together with the dynamic data to the event processing framework, wherein the device is further arranged to provide the virtual data stream and the dynamic data to the event processing framework; and
    use the event processing framework for providing a response to the input query utilizing the dynamic data and the static data result.

10. The device according to claim 9, wherein said device is a control device of the industrial system.

11. The device according to claim 10, wherein the device is connected to the industrial system via a network, in particular via the Internet.

12. A system comprising at least one device according to claim 9.

* * * * *